(12) United States Patent
 Wiederhold

(10) Patent No.: US 7,772,715 B2
(45) Date of Patent: Aug. 10, 2010

(54) POWER-STATION INSTALLATION

(75) Inventor: Karl Wiederhold, Bruchsal (DE)

(73) Assignee: Alstom Technology Ltd, Baden (CH)

( * ) Notice: Subject to any disclaimer, the term of this patent is extended or adjusted under 35 U.S.C. 154(b) by 563 days.

(21) Appl. No.: 11/430,946

(22) Filed: May 10, 2006

(65) Prior Publication Data

US 2006/0262465 A1      Nov. 23, 2006

Related U.S. Application Data

(63) Continuation of application No. PCT/EP2004/052145, filed on Sep. 13, 2004.

(30) Foreign Application Priority Data

Sep. 12, 2003   (EP)   .................. 03103381
Oct. 18, 2003    (DE)   ................. 103 48 522

(51) Int. Cl.
*H02J 3/00* (2006.01)
*F02C 1/00* (2006.01)
*H02B 1/00* (2006.01)
*H02B 7/00* (2006.01)

(52) U.S. Cl. ........................... 307/17; 307/115; 60/648; 60/727; 60/728; 361/601; 361/602; 361/603; 361/605

(58) Field of Classification Search ................ 361/601, 361/602, 603, 605; 60/648, 727, 728; 307/17, 307/115
See application file for complete search history.

(56) References Cited

U.S. PATENT DOCUMENTS

| 5,491,969 | A | 2/1996 | Cohn et al. |
| 5,537,822 | A | 7/1996 | Shnaid et al. |
| 5,666,800 | A * | 9/1997 | Sorensen et al. ............. 60/781 |
| 2002/0015280 | A1 | 2/2002 | Marmonier et al. |

FOREIGN PATENT DOCUMENTS

| DE | 2 029 689 | 12/1971 |
| DE | 2 029 690 | 12/1971 |
| DE | 236 211 A1 | 5/1986 |
| DE | 102 07 560 A1 | 9/2003 |
| EP | 0 982 828 A2 | 3/2000 |
| EP | 1 168 551 A1 | 1/2002 |
| WO | WO2004/005685 A1 | 1/2004 |

OTHER PUBLICATIONS

German Search Report issued Oct. 5, 2004 in German Patent Application No. 10348.522.8.
International Search Report issued Dec. 21, 2004 in International Patent Application No. PCT/EP2004/052145.
International Preliminary Report on Patentability issued Feb. 1, 2006 in International Patent Application No. PCT/EP2004/052145 (in German language and English translation).
Written Opinion of the International Search Authority issued in International Patent Application No. PCT/EP2004/052145 and received by WIPO Jan. 3, 2005 (in German language).

* cited by examiner

*Primary Examiner*—Albert W Paladini
*Assistant Examiner*—Hal I Kaplan
(74) *Attorney, Agent, or Firm*—Buchanan Ingersoll & Rooney PC

(57) ABSTRACT

Power-generating units and compressor units are arranged in a compressed-air energy storage power station. According to one aspect of the invention, a common grid connection transformer is arranged, to which the power-generating units and the compressor units can selectively be connected. According to a further aspect of the invention, the power-station installation is subdivided into a power-generating area (I) in which the power-generating units are arranged, a switching and voltage-conversion area (II) in which a grid connection transformer is arranged, and a compressor area (III) in which the compressor units are arranged. The stated areas are arranged physically separately from one another. Power-station installations according to the invention can advantageously be combined to form modular power-station centers, which advantageously have common voltage rails and media rails.

13 Claims, 1 Drawing Sheet

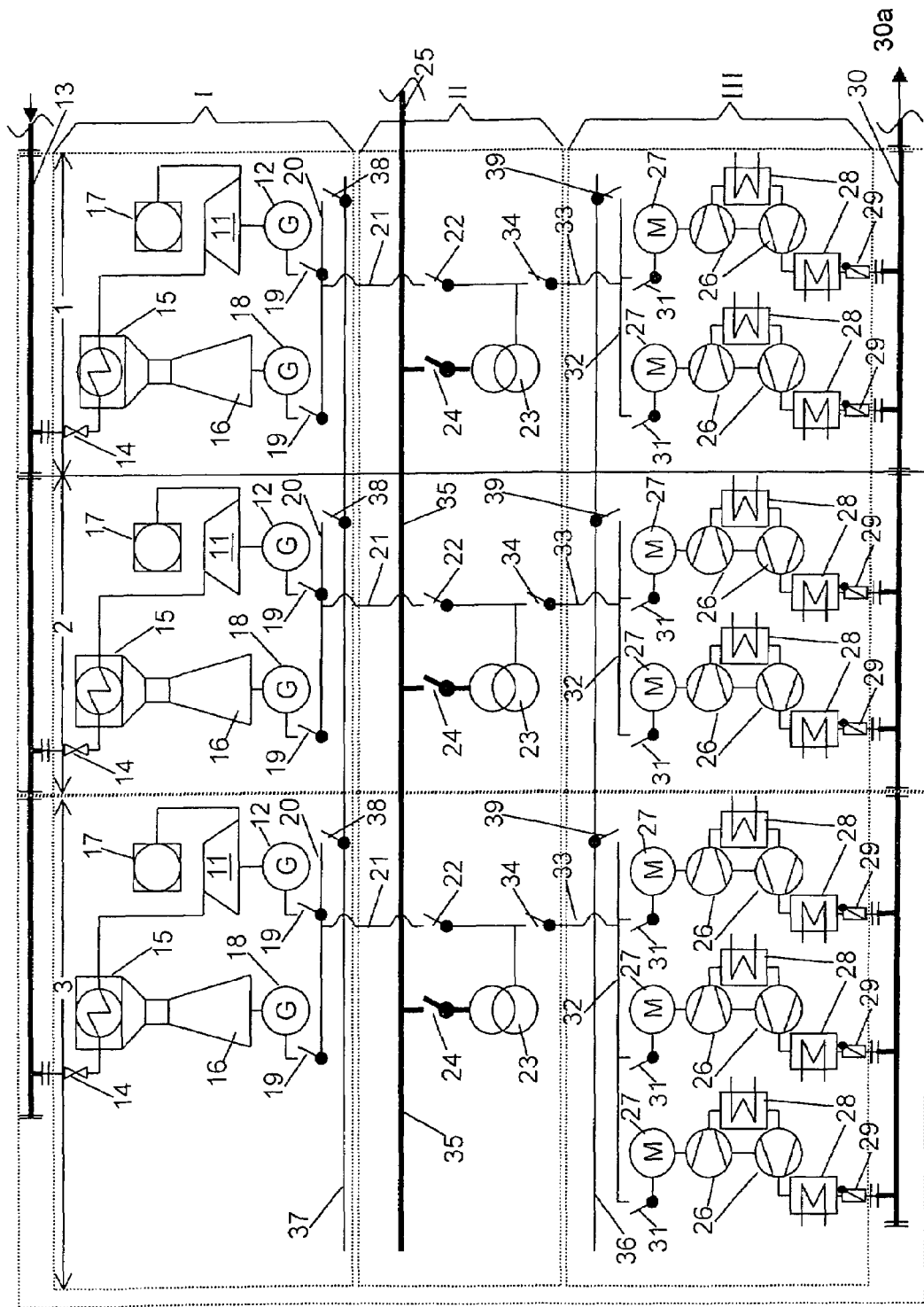

POWER-STATION INSTALLATION

TECHNICAL FIELD

The present invention relates to a power-station installation as claimed in the precharacterizing clause of claim 1, and to a power-station center which has at least two power-station installations according to the invention.

PRIOR ART

Energy storage systems, inter alia, are used in order to equalize out the very highly non-uniform power demands on electricity grid systems over the course of a day. One type of energy storage system uses cheap electricity from basic-load power stations, which cannot be used by other consumers during times when demand is low in order to drive compressors and to fill pressure stores with compressed air. When demand peaks occur, the compressed air is expanded through expansion turbines, which drive generators and in this way generate a peak load current.

Power stations such as these accordingly have power-generating units and compressor units. In this case, a power-generating unit comprises at least one expansion turbine and one generator which can be driven by it. The power-generating unit may also optionally have a gas turbine set, the exhaust gases from which flow through the primary side of a heat exchanger apparatus, through whose secondary side storage fluid, which is flowing from the storage volume to the expansion turbine, flows in such a way that the storage fluid is heated before being expanded in the expansion turbine.

Both the power-generating unit and the compression unit have electrical machines with ratings in the order of magnitude of several tens to several hundreds of MW, which need to be connected to the high-voltage grid. This connection requires corresponding high-power transformers, which are capital and resource-intensive.

U.S. Pat. No. 5,537,822 has disclosed a power-station installation of this generic type in which the expansion turbine and the compressor have a common electrical machine to which they can be connected by means of couplings or clutches. This admittedly considerably simplifies the electrical equipment of the power-station installation, but results in physical interconnection of the power-generating unit and the compressor unit. The arrangement which is proposed in U.S. Pat. No. 5,537,822 results in little design flexibility for the installation. A change in the relationship between the compressor rating and the electricity generation rating intrinsically necessitates complete redesign of the power-station installation, and considerable physical complexity. Maintenance or else conversion work on the power-generating unit or on the compressor unit in general necessitates a complete shut-down of the respective other unit as well; even if continued operation were still to be possible from the purely technical point of view, complete shut-down is unavoidable as a result of reasons relating to the purely physical accessibility as well as the safety of work aspects of a highly interconnected arrangement. Step-by-step removal of the power-station installation can be achieved only with great difficulty, if at all, owing to the functional interconnection; for reasons relating to accessibility and space constraints, even the planning and construction phase cannot be carried out with the various components in parallel and independently of one another; the same applies to repair and maintenance tasks, which results in little flexibility for planning and extension, as well as long construction and maintenance times, resulting in reduced availability and delayed repayment of the capital and technical resources invested.

DESCRIPTION OF THE INVENTION

The invention provides a remedy for this. The invention as characterized in the claims is based on the object of specifying a power-station installation of the type mentioned initially which has the capability to avoid the disadvantages of the prior art, with one particular aim being to increase the availability of the compressed-air energy storage power-station installation. A further aim is to improve the flexibility for planning, for the construction and extension phase, for maintenance and for operation, thus resulting in significantly increased availability and thus use of all the invested resources. A further aim of the invention is to minimize the use of resources without having to accept functional restrictions.

According to a first aspect of the invention, this object is achieved using the totality of the features of claim 1. According to a second aspect of the invention, this object is achieved using the totality of the features of claim 2.

The essence of the invention is thus on the one hand to separate the functional units of the power-station installation and to implement a consistent modular configuration for the power-station installation. In this case, the functional units are completely separated and arranged in a modular form both in terms of their components that are used as well as physically, with regard to their arrangement in the power-station area. The connection between the modular functional units is provided by means of simple and functionally single-purpose interfaces. A design which is simple and clear both functionally and physically simplifies maintenance and fault localization in the event of failures, as well as the replacement of individual elements, and this further significantly improves the availability. The invention also makes advantageous use of the knowledge that, although the power-generating unit and the compressor unit must have the capability to be operated independently from one another, they are, however, in each case operated only for a limited time per day, and at different times. While the former results in the requirement to arrange as many components as possible independently of one another in order to improve the availability and the operational flexibility, the latter knowledge opens up the capability to share components, and thus to minimize the use of resources.

According to a further aspect of the invention, the energy-generating unit and the compressor unit share a common grid connection transformer.

Components which can be shared include in particular those whose physical arrangement with respect to other functional units is highly flexible, which have a low failure probability, can easily be replaced within a power-station center and at the same time require major use of resources. According to the invention, the power-generating unit and the compressor unit in the power-station installation have a common transformer for connection to the high-voltage electricity grid. The transformer, which is also referred to as a stepping transformer, couples a grid high-voltage rail at, for example, 380 kV to a power-station medium-voltage rail, typically at 21 kV. The grid connection transformer is a comparatively expensive power-station component, using large amounts of resources. On the other hand, the failure probability and the maintenance requirements are less than in the case of the rotating electrical machine, which is shared by the energy-generating unit and the compressor unit in accordance with the prior art that is known from U.S. Pat. No. 5,537,822. Furthermore, the arrangement can be freely chosen within wide limits in such a way as to ensure easy accessibility and, associated with this, the rapid replacement of defective components.

According to the invention a power-station installation has a power-generating area in which all of the power-generating units are arranged and, physically separately from this, a compressor area in which all of the compressor units are arranged, as well as a switching and voltage-conversion area, in which, in particular, the high-voltage electrical items are arranged. The physically separate arrangement of the switching and voltage-conversion area in this case makes it possible to carry out work in the other areas without having to shutdown the high-voltage electrical items, and thus the entire power-station installation, for safety at work reasons. It is particularly advantageous to arrange the switching and voltage-conversion area between the power-generating area and the compressor area, which allows the electrical interfaces to be implemented particularly simply and linearly.

For the same reason, according to one preferred embodiment of the invention, the power-generating units are arranged in the power-generating area, and the compressor units are arranged in the compressor area, such that their electrical machines, that is to say the generators and the drive motors, are arranged adjacent to the switching and voltage-conversion area.

Power-station centers can be composed in a particularly simple manner from the modular power-station installations according to the invention. In this case, a power-station center has at least two power-station installations according to the invention, whose respective functional areas are each arranged adjacent to one another. A common high-voltage rail can thus, in particular, be arranged in a particularly simple manner, which connects the switching and voltage-conversion areas of the individual power-station installations to one another, and to which the respective grid connection transformers are or can be connected.

This arrangement of the power-station installations in a power-station center likewise allows extremely simple arrangement of common voltage rails and electrical supply rails for the power-generating and compressor units, thus providing a high level of redundancy between the components of the individual power-station installations.

BRIEF DESCRIPTION OF THE DRAWING

The invention will be explained in more detail in the following text with reference to one exemplary embodiment, which is illustrated in the drawing. The single FIGURE shows a power-station center according to the invention.

Elements which are not directly required in order to assist understanding of the invention are omitted. The exemplary embodiment should be regarded as being purely instructional and is not intended to be used to restrict the invention as characterized in the claims.

APPROACH TO IMPLEMENTATION OF THE INVENTION

The single FIGURE shows a power-station center which comprises three power-station installations according to the invention, which are intrinsically autonomous. Three power-station installations 1, 2 and 3 according to the invention are arranged alongside one another in such a way that the power-generating areas, the switching and voltage-conversion areas and the compressor areas of two power-station installations are in each case arranged adjacent. The entire power-station center is thus functionally subdivided into a power-generating area I, a switching and voltage-conversion area II, and a compressor area III. The power-generating area I has an expansion turbine 11, which expands compressed air from a pressure store which is not illustrated and in the process drives a generator 12 in order to generate power. The compressed air is carried via a compressed-air rail 13. The compressed-air rail 13 is in the form, for example, of a pipeline 13. In the example, this is designed to assist the modular design in such a way that each power-station installation has one pipe with two connecting flanges indicated at the ends. The individual pipes of the power-station units are thus flange-connected to one another, and one end face of the pipe of the power-station installation 1 is flange-connected to a supply line, while the piece of pipe from the installation 3 is closed by a blank flange. Furthermore, branch pieces branch off, via which the supply lines for the expansion turbines can likewise be connected by means of flanges; it would also, of course, be possible to use other connections, such as welded joints, instead of flange connections. Starting from the air supply line 13, each power-station installation is connected to a shut-off and control element 14, by means of which the air mass flow that is supplied to the expansion turbine can be controlled. The air which flows via the control element 14 is passed through a recuperator, heat exchanger, which is arranged in the exhaust gas path or chimney 15 of a gas turbine set 16, with the air being heated in a heat-exchanging process with the exhaust gases from the gas turbine set before it flows into the expansion turbine 11, where it is expanded and finally flows away via an exhaust air chimney 17. The arrangement of the gas turbine set 16 is optional. The gas turbine set 16 drives a further generator 18. The generators 12 and 18 can be connected to a voltage rail 20 by means of separate generator switches 19. A connecting line 21 connects the voltage rail 20 to the switching and voltage-conversion area II of the power-station installation. The connecting line 21 on the secondary side of the grid connection transformer 23 can be connected by means of a connecting switch 22. This transformer's primary can in turn be connected to the high-voltage grid 25 by means of a grid switch 24. During power operation, the grid switch 24 of at least one installation 1, 2 or 3 is closed. The connecting switch 22 is closed and at least one of the generator switches 19 is closed. At least one generator 12 or 18 then feeds electrical power to the voltage rail 20, and this electrical power is transformed in the grid connection transformer 23 to the grid high voltage, and is emitted to the high-voltage grid 25. A compressor area III is arranged on the opposite side of the switching and voltage-conversion area II to the power-generating area I. Compressor units are arranged in the compressor area. According to the illustrated embodiment, two compressors 26 are in each case arranged on a common shaft, with their flows connected in series. Two series-connected compressors are in each case driven via a drive motor 27, and compress and pass air via charging air coolers 28 and rebound elements 29 to a charging rail 30. This is designed analogously to the compressed-air rail 13 in the form of a building-block system composed of standardized pipeline pieces. An arrow indicates how the compressed air is passed to a storage volume in a manner which is not illustrated but is in any case familiar to those skilled in the art. The drive motors 27 can be electrically connected to a voltage rail 32 via motor switches 31. The connecting line 33 represents the interface between the compressor area III and the switching and voltage-conversion area II. The compressor units can be connected to the secondary of the grid connection transformer 23 by means of the connecting switch 34. During power operation, as described above, the switch 34 is open, and the switch 22 is closed. During charging operation, the connecting switch 22 of the power-generating unit is open, and the connecting switch 34 of the compressor unit is closed; furthermore, at least one of the motor switches 31 is or are closed. Electrical power then flows via the grid switch 24 to the primary of the grid connection transformer 23, where its voltage is down-converted, and drives at least one of the motors 27. This in turn drives the compressors 26 which are arranged on the same shaft as it and compress air, which is passed via the charging rail 30 to the storage volume 30a. The air that is stored there is then available for expansion, generating shaft power within power operation in a manner known per se, in the expansion turbine 11, and is thus available to drive the generator 12. It has thus been found that the grid connection transformer 23 can optionally be used for charging operation and for power operation in an excellent and efficient manner. One common grid connection transformer is completely sufficient for the power-generating unit and the compressor unit. In this case, one common transformer can be arranged at any desired location in contrast, for example, to a common motor-generator unit as is known from the prior art. Since the transformer, per se, has no moving parts, the maintenance effort and the defect probability are likewise low, thus ensuring high availability of the jointly used component. Furthermore, it should be noted that the illustration also corresponds to an exemplary arrangement at a power-station site. In this case, the transformer and the switching devices are arranged such that they are easily accessible, thus allowing repair or replacement to be carried out quickly, and without any influence on the rest of the operation, in the event of damage. Furthermore, the complete separation of the three areas has been found to be very highly advantageous. The connecting lines 21 and 33, which are arranged as interfaces, have little complexity, thus simplifying fault localization. Furthermore, repair and maintenance tasks can be carried out in the compressor or power-generating area, owing to the separation and physical separation of the areas, without having to completely shutdown the switching and voltage-conversion area, for safety at work reasons. This means that the power-generating area can continue to operate without any problems during work in the compressor area, thus significantly increasing the availability. Excellent accessibility to the power-generating area and to the compressor area is likewise ensured, thus further shortening shut-down times.

A further major advantage is the capability to plan and to install, as well as to extend, the power-generating units and the compressor units completely independently of one another. The only criterion that need be noted in this case is that the accumulated power of all the motors or generators in a power-station installation should not exceed the rating of the grid connection transformer; ideally, all of the power variables are chosen to be in the same order of magnitude in this case.

The described embodiment of the invention also illustrates the excellent capabilities for modular combination of a plurality of power-station installations according to the invention to form a power-station center. The illustrated power-station center has three power-station installations 1, 2 and 3, which are arranged aligned. This arrangement on the one hand allows the power-generating areas and compressor area of the individual installations to be combined, for example with all the power-generating units and all the compressor units in one building in each case being combined. Furthermore, as illustrated, all the installations can be connected to a modular compressed-air discharge rail 13 and to a common compressed-air charging rail 30. Furthermore, according to the invention, all of the switching and voltage-conversion areas are connected to one another by means of a common high-voltage rail, to which the primaries of the individual grid connection transformers can be connected via the respective grid switches. The common high-voltage rail and the modular charging and discharge rail allow the power-station center to be extended very easily; for example, the individual illustrated power-station installations can be constructed successively. Extension is likewise very easily possible: a fourth switching and voltage-conversion area can simply be attached to the high-voltage rail 35 without influencing the rest of the operation even to a very minor extent. Depending on the requirements, a further power-generating unit can then first of all be arranged, with a further compressor unit being added only later, or else vice versa, depending on whether the priority is the charging capacity or the power-generating capacity. The available financial resources and technical resources can thus be used objectively, and as well as possible.

Furthermore, as can be seen, the power-station installation 3 has three compressor units, once again in this case showing the high degree of flexibility offered by the concept according to the invention, which is modular physically, functionally and in terms of circuitry.

According to the exemplary embodiment, the power-station center also has a common electrical compressor voltage rail 36 and a common power-generating voltage rail 37. Connecting switches 38 and 39 allow the installation voltage rails 20 and 32 to be connected to the common voltage rails 37 and 26, respectively. This makes it possible to connect the grid connection transformer of one power-station installation to the motors or generators of another power-station installation, with this redundancy once again significantly increasing the availability. Failure of the entire power-station center is thus highly improbable.

Furthermore, it is also possible by means of a which is not illustrated but is obvious to a person skilled in the art in the sense of the statements made above, to jointly use a single starting apparatus, for example a static frequency converter, for the compressor units and the power-generating units of one power-station installation. These may of course also be designed in such a way that they can be connected to a common starter rail of the power-station center and can be used for starting another respective power-station installation.

Modifications to the exemplary embodiment are, of course, also possible within the scope of the claimed invention; for example, the power-generating units may have a different form of process control, or the compressor units may have a different number of compressors or may be arranged differently without departing from the idea of the invention.

LIST OF REFERENCE SYMBOLS

1 Power-station installation
2 Power-station installation
3 Power-station installation
11 Expansion turbine
12 Generator
13 Compressed-air rail, discharge rail
14 Shut-off and control element
15 Exhaust gas path, chimney
16 Gas turbine set
17 Exhaust air chimney
18 Generator
19 Generator switch
20 Voltage rail
21 Connecting line
22 Connecting switch 23 Grid connection transformer
24 Grid switch
25 High-voltage grid
26 Compressor
27 Drive motor
28 Charging air cooler
29 Rebound element
30 Compressed-air rail, charging rail
31 Motor switch
32 Voltage rail
33 Connecting line
34 Connecting switch
35 Common high-voltage rail
36 Common compressor voltage rail
37 Common power-generating voltage rail
38 Connecting switch
39 Connecting switch
I Power-generating area
II Switching and voltage-conversion area
III Compressor area

The invention claimed is:

1. A power-station installation comprising:
a power-generating unit having a power-source machine and at least one generator, the power-source machine including an expansion turbine configured to drive a first generator of the at least one generator;
a pressure storage volume;
a compressor unit having at least one compressor and at least one motor, the compressor unit configured to charge the pressure storage volume with a gas; and
a controller configured to feed the expansion turbine with the gas from the pressure storage volume charged by the compressor unit such that power is generated in the first generator,
wherein a single, common grid connection transformer having a primary and a secondary is arranged for coupling the at least one motor and the at least one generator to a high-voltage electricity grid, the primary of the grid connection transformer being connectable to the high-voltage electricity grid, and a power-generating unit or a compressor unit being selectively connectable to the secondary of the grid connection transformer via switching apparatuses.

2. A power-station installation comprising a power-generating unit having a power-source machine and a generator, and a compressor unit having at least one compressor and at least one motor,
wherein the power-station installation comprises the following physically separated arranged areas into which the power-station installation is split:
a power-generating area into which each power-generating unit is arranged,
a compressor area into which each compressor unit is arranged, and
a switching and voltage-conversion area into which a grid connection transformer is arranged.

3. The power-station installation as claimed in claim 2, wherein the switching and voltage-conversion area is arranged physically between the power-generating area and the compressor area.

4. The power-station installation as claimed in claim 2, wherein each power-generating unit is arranged such that their respective generators are arranged adjacent to the switching and voltage-conversion area, and each compressor unit is arranged such that their respective motors are arranged adjacent to the switching and voltage-conversion area.

5. A power-station center, having at least two power-generating installations as claimed in claim 2, wherein each power-generating installation is arranged aligned such that the respective power-generating areas, the respective switching and voltage-conversion areas and the respective compressor areas of two installations are in each case directly adjacent to one another.

6. The power-station center as claimed in claim 5, comprising a common high-voltage rail, which connects all of the switching and voltage-conversion areas of the power installations to one another, and which is connected to the high-voltage grid, and to which the primaries of all the grid connection transformers are connectable.

7. The power-station center as claimed in claim 5, comprising a common electrical compressor voltage rail, to which all of the compressor units are connectable.

8. The power-station center as claimed in claim 5, comprising a common electrical power-generating voltage rail, to which all of the power-generating units are connectable.

9. The power-station installation as claimed in claim 2, comprising:
a first gas rail arranged to form at least part of a border for the compressor area, and
a second gas rail arranged to form at least part of a border for the power-generating area,
wherein the first rail is coupled to a compressor unit of the compressor area, and
the second rail is coupled to a power-generating unit of the power-generating unit area.

10. The power-station installation as claimed in claim 9, wherein
the first gas rail is coupled to each compressor unit of the compressor area, and
the second gas rail is coupled to each power-generating unit of the power-generating unit area.

11. The power-station installation as claimed in claim 1, comprising a gas turbine set including an exhaust gas heat exchanger configured to heat gas from the pressure storage volume before the gas enters the turbine.

12. The power-station installation as claimed in claim 9, wherein the gas turbine set is configured for selectable operation such that the gas from the pressure storage volume is heated by the exhaust gas heat exchanger when the gas turbine set is selectably operated.

13. A power-station installation comprising a power-generating unit having a power-source machine and a generator, and a compressor unit having at least one compressor and at least one motor,
wherein the power-station installation comprises the following physically separated arranged areas into which the power-station installation is split:
a power-generating area into which each power-generating unit is arranged,
a compressor area into which each compressor unit is arranged, and
a switching and voltage-conversion area, into which a grid connection transformer is arranged,
wherein a single, common grid connection transformer having a primary and a secondary is arranged for coupling the at least one motor and the at least one generator to a high-voltage electricity grid, the primary of the grid connection transformer being connectable to the high-voltage electricity grid, and a power-generating unit or a compressor unit being selectively connectable to the secondary of the grid connection transformer via switching apparatuses.

* * * * *